(12) United States Patent
Murakami et al.

(10) Patent No.: US 7,319,809 B2
(45) Date of Patent: Jan. 15, 2008

(54) RECORDING APPARATUS, RECORDING METHOD, AND PROGRAM, AND RECORDING MEDIUM

(75) Inventors: Masaharu Murakami, Tokyo (JP); Kenichiro Aridome, Kanagawa (JP); Naoki Morimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1107 days.

(21) Appl. No.: 10/258,091

(22) PCT Filed: Feb. 19, 2002

(86) PCT No.: PCT/JP02/01413

§ 371 (c)(1),
(2), (4) Date: Oct. 18, 2002

(87) PCT Pub. No.: WO02/067582

PCT Pub. Date: Aug. 29, 2002

(65) Prior Publication Data
US 2003/0049029 A1 Mar. 13, 2003

(30) Foreign Application Priority Data
Feb. 20, 2001 (JP) .............................. 2001-43396

(51) Int. Cl.
H04N 5/91 (2006.01)
H04N 5/915 (2006.01)
H04N 5/92 (2006.01)

(52) U.S. Cl. .......................... 386/69; 386/95; 386/125

(58) Field of Classification Search ................... 382/1, 382/46, 52, 55; 348/231.2, 333.051; 707/2, 707/104.1
See application file for complete search history.

(56) References Cited

U.S. PATENT DOCUMENTS 6,018,744 A * 1/2000 Mamiya et al. .......... 707/104.1

(Continued)

FOREIGN PATENT DOCUMENTS

JP 2000-235780 8/2000

(Continued)

OTHER PUBLICATIONS

Russ J C: "Quicktime as a Basis for Time Sequence Imaging" Journal of Computer-Assisted Microscopy, Plenum Press, New York, NY, US, vol. 7, No. 2, Jun. 1, 1995, pp. 113-125, XP000600415 ISSN: 1040-7286.

(Continued)

*Primary Examiner*—Thai Q. Tran
*Assistant Examiner*—Michael P Choi
(74) *Attorney, Agent, or Firm*—Frommer Lawrence & Haug LLP; William S. Frommer; Thomas F. Presson

(57) ABSTRACT

A recording apparatus according to the present invention, comprising a creating means for excerpting excerpt information from each of a plurality of files recorded on a record medium, correlating the plurality of excerpt information with entity data of the plurality of files, and creating an index file that stores the correlated data in a predetermined format, a record medium identification information storing means for storing identification information that identifies the record medium in the predetermined format to the index file, and a recording means for recording the index file to the record medium.

13 Claims, 10 Drawing Sheets

U.S. PATENT DOCUMENTS

| | | | |
|---|---|---|---|
| 6,871,205 B1* | 3/2005 | Yamada et al. | 707/104.1 |
| 2001/0014070 A1* | 8/2001 | Ando et al. | 369/59.25 |
| 2003/0206710 A1* | 11/2003 | Ferman et al. | 386/46 |

FOREIGN PATENT DOCUMENTS

| | | |
|---|---|---|
| JP | 2001-111963 | 4/2001 |

OTHER PUBLICATIONS

Walsh A E: "Programming Quicktime Multimedia to the MACS" Dr. Dobbs Journal, Redwood City, CA, US, vol. 17, No. 7, Jul. 1, 1992, pp. 76, 78-80, 102, XP000600303.

Apple Computer: "Quicktime File Format" Announcement Apple Computer, 2000, pp. 1-351, XP002292974.

* cited by examiner

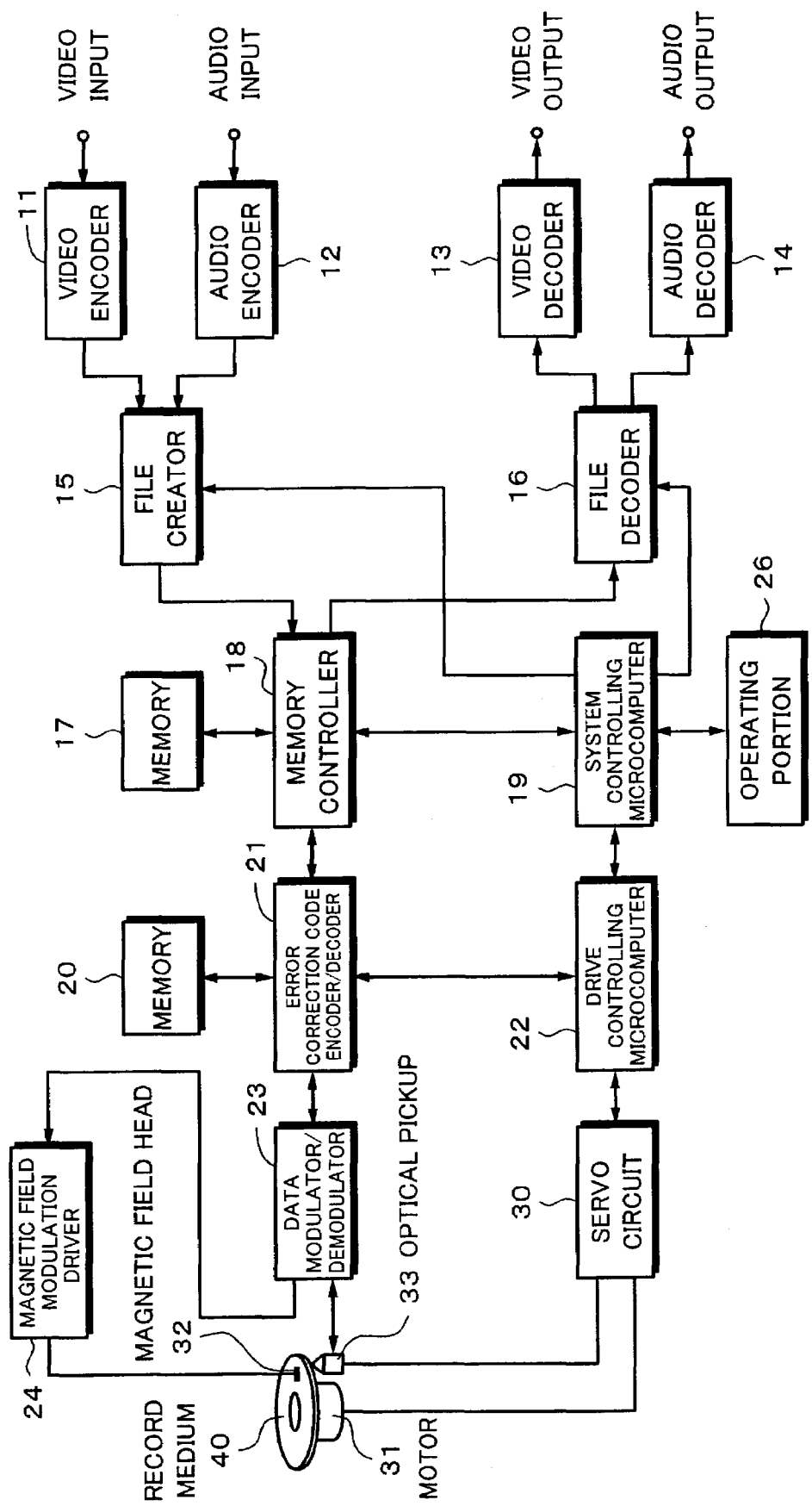

Fig. 6

| START BYTE POSITION | DATA LENGTH | FIELD NAME |
|---|---|---|
| 0 | L_PR1 | AV FILE PROPERTY #1 |
| L_PR1 | L_PR2 | AV FILE PROPERTY #2 |
| L_PR1 + L_PR2 | L_PR3 | AV FILE PROPERTY #3 |
| ⋮ | ⋮ | ⋮ |
| L_PR1 + ⋯ + L_PRn−1 | L_PRn | AV FILE PROPERTY #n |

Fig. 7

| START BYTE POSITION | DATA LENGTH | FIELD NAME |
|---|---|---|
| 0 | 3 | ENTRY NUMBER |
| 3 | 1 | VERSION |
| 4 | 2 | FLAG |
| 6 | 1 | DATA TYPE |
| 7 | 4 | CREATION TIME |
| 11 | 4 | MODIFICATION TIME |
| 15 | 4 | DURATION |
| 19 | VARIABLE LENGTH | FILE IDENTIFIER |

Fig. 8

| BIT | VALUE | DESCRIPTION |
|---|---|---|
| 0 | 0 | ENTRY DATA IS FILE |
|   | 1 | ENTRY DATA IS FILE GROUP OR DIRECTORY |
| 1 | 0 | THERE IS NO DATA THAT IS REFERENCED IN TITLE FILE OR AV FILE |
|   | 1 | THERE IS DATA THAT IS REFERENCED IN TITLE FILE OR AV FILE |
| 2 | 0 | TEXT HAS NOT BEEN REGISTERED TO TITLE FILE OR AV FILE |
|   | 1 | TEXT HAS BEEN REGISTERED TO TITLE FILE OR AV FILE |
| 3 | 0 | TEXT DATA IS CONTAINED IN INDEX FILE |
|   | 1 | TEXT DATA IS CONTAINED IN TITLE FILE OR AV FILE DESIGNATED BY PROPERTY DATA |
| 4 | 0 | THUMBNAIL DATA HAS NOT BEEN REGISTERED TO TITLE FILE OR AV FILE |
|   | 1 | THUMBNAIL DATA HAS BEEN REGISTERED TO TITLE FILE OR AV FILE |
| 5 | 0 | THUMBNAIL DATA IS CONTAINED IN INDEX FILE |
|   | 1 | THUMBNAIL DATA IS CONTAINED IN TITLE FILE OR AV FILE DESIGNATED BY PROPERTY DATA |
| 6 | 0 | INTRO DATA HAS NOT BEEN REGISTERED TO TITLE FILE OR AV FILE |
|   | 1 | INTRO DATA HAS BEEN REGISTERED TO TITLE FILE OR AV FILE |
| 7 | 0 | INTRO DATA IS CONTAINED IN INDEX FILE |
|   | 1 | INTRO DATA IS CONTAINED IN TITLE FILE OR AV FILE DESIGNATED BY PROPERTY DATA |
| OTHER |   | RESERVED |

Fig. 9

| START BYTE POSITION | DATA LENGTH | FIELD NAME |
|---|---|---|
| 0 | L_TX1 | TEXT DATA #1 |
| L_TX1 | L_TX2 | TEXT DATA #2 |
| L_TX1 + L_TX2 | L_TX3 | TEXT DATA #3 |
| ⋮ | ⋮ | ⋮ |
| L_TX1 + ⋯ + L_TXn−1 | L_TXn | TEXT DATA #n |

Fig. 10

| START BYTE POSITION | DATA LENGTH | FIELD NAME |
|---|---|---|
| 0 | L_TH1 | THUMBNAIL DATA #1 |
| L_TH1 | L_TH2 | THUMBNAIL DATA #2 |
| L_TH1 + L_TH2 | L_TH3 | THUMBNAIL DATA #3 |
| ⋮ | ⋮ | ⋮ |
| L_TH1 + ⋯ + L_THn−1 | L_THn | THUMBNAIL DATA #n |

Fig. 11

| START BYTE POSITION | DATA LENGTH | FIELD NAME |
|---|---|---|
| 0 | L_IN1 | INTRO DATA #1 |
| L_IN1 | L_IN2 | INTRO DATA #2 |
| L_IN1 + L_IN2 | L_IN3 | INTRO DATA #3 |
| ⋮ | ⋮ | ⋮ |
| L_IN1 + ⋯ + L_INn−1 | L_INn | INTRO DATA #n |

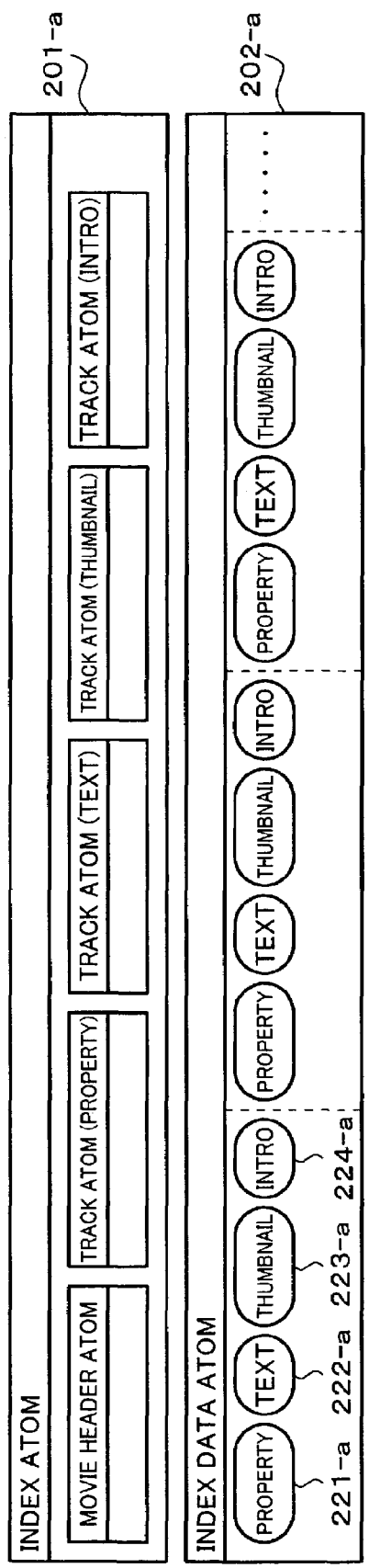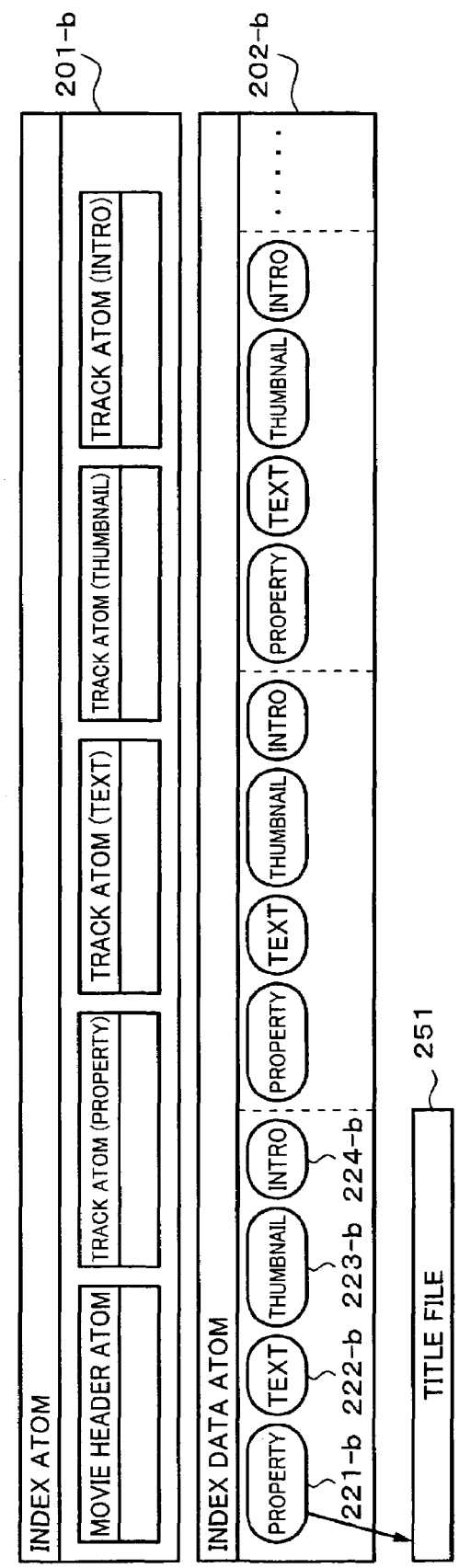

Fig. 13

| TRACK (PROPERTY) | | PROPERTY DATA | |
|---|---|---|---|
| CHUNK OFFSET | DATA LENGTH | ENTRY NUMBER | DATA TYPE |
| P_CO 1 | P_L 1 | 1 | MOVIE |
| P_CO 2 | P_L 2 | 2 | MOVIE |
| P_CO 3 | P_L 3 | 3 | STILL PICTURE |
| P_CO 4 | P_L 4 | DTE | DISC TITLE |
| P_CO 5 | P_L 5 | 4 | AUDIO |

RECORDING APPARATUS, RECORDING METHOD, AND PROGRAM, AND RECORDING MEDIUM

TECHNICAL FIELD

The present invention relates to a recording apparatus that records video data, audio data, and so forth to a record medium, in particular, to a recording apparatus that records information that identifies a record medium in a predetermined format to the record medium. In addition, the present invention relates to a recording method, a program, and a record medium used in such a recording apparatus. Moreover, the present invention relates to an electronic camera that has such a recording apparatus.

BACKGROUND ART

Conventionally, in a recording apparatus such as a camcorder that records video data, audio data, and so forth, a plurality of pieces of data of several scenes are recorded as a file on a disc shaped record medium such as a magneto-optical disc, an optical disc, or the like.

Such a recording apparatus equipped with a display portion, such as a liquid crystal display panel or an organic electroluminescence display panel, and a sound generating portion, such as a speaker, is known as a recording and reproducing apparatus having functions for reproducing and editing recorded data.

The user who uses such a recording apparatus or such a recording and reproducing apparatus tends to record data to different record mediums categorized as record dates, travel destinations, events, and so forth. Thus, the user often have a plurality of record mediums. In such a case, when the user searches the record mediums for a scene that he or she wants to reproduce and/or edit, he or she should insert the record mediums into the recording and reproducing apparatus one by one, reproduce each file name and each index file, and identify the content of each file recorded on the record mediums.

An index file is a file that contains a collection of information that identifies contents of a plurality of files recorded on a record medium. For example, the index file is a file that contains one featured scene of each file, a file that contains a featured sound for several seconds of each file, or a file that contains a featured character string of each file.

However, in the method that the user searches many files for a desired one by changing record mediums and checking a file list of each record medium, it takes a time to display the file list. In particular, depending on the size of the display screen and the number of files recorded on a record medium, since all the index cannot be displayed at a time, it takes a longer time.

In addition, when the reproducing method for an index file is different from that for information that identifies a record medium, the recording and reproducing apparatus should have a circuit that deals with both the reproducing methods.

Therefore, an object of the present invention is to provide a recording apparatus and a recording method that allow identification information for a record medium to be recorded in the same reproducing method as an index file. Another object of the present invention is to provide a program that causes a computer to execute such a recording method and a record medium from which the computer can read the program.

DISCLOSURE OF THE INVENTION

A recording apparatus of the present invention comprises a creating means for excerpting excerpt information from each of a plurality of files recorded on a record medium, correlating the plurality of excerpt information with entity data of the plurality of files, and creating an index file that stores the correlated data in a predetermined format, a record medium identification information storing means for storing identification information that identifies the record medium in the predetermined format to the index file, and a recording means for recording the index file to the record medium.

A recording method of the present invention comprises the steps of excerpting excerpt information from each of a plurality of files recorded on a record medium, correlating the plurality of excerpt information with entity data of the plurality of files and creating an index file that stores the correlated data in a predetermined format, storing identification information that identifies the record medium in the predetermined format to the index file, and recording the index file to the record medium.

A program of the present invention is a program that causes a computer to create and record an index file, the program comprising the steps of excerpting excerpt information from each of a plurality of files recorded on a record medium, correlating the plurality of excerpt information with entity data of the plurality of files and creating the index file that stores the correlated data in a predetermined format, storing identification information that identifies the record medium in the predetermined format to the index file, and recording the index file to the record medium.

A record medium of the present invention is a record medium on which a program has been recorded, the program causing a computer to create and record an index file, the program comprising the steps of excerpting excerpt information from each of a plurality of files recorded on a record medium, correlating the plurality of excerpt information with entity data of the plurality of files and creating the index file that stores the correlated data in a predetermined format, storing identification information that identifies the record medium in the predetermined format to the index file, and recording the index file to the record medium.

An electronic camera of the present invention is an electronic camera that records an image signal of an image of an object that is photographed to a record medium, the electronic camera comprising a creating means for excerpting excerpt information from each of a plurality of files recorded on the record medium, correlating the plurality of excerpt information with entity data of the plurality of files, and creating an index file that stores the correlated data in a predetermined format, a record medium identification information storing means for storing identification information that identifies the record medium in the predetermined format to the index file, and a recording means for recording the index file to the record medium.

In the recording apparatus, the recording method, the program, the record medium on which the program has been recorded, and the electronic camera that has the recording apparatus, identification information that identifies a predetermined one in a plurality of record mediums is stored in an index file that contains excerpt information of a plurality of files recorded on a record medium in the format of the index file. Thus, with the identification information that the recording apparatus reads from a record medium, the user can identify the record medium. As a result, the user can quickly search for a desired record medium. In addition, when the recording apparatus reads an index file from a record medium, the apparatus can obtain the identification information. Thus, the recording apparatus does need to provide a special mechanism and method for reading the identification information.

In the recording apparatus, the recording method, the program, the record medium on which the program has been recorded, and the electronic camera that has the recording apparatus, the identification information may be stored in an area at the beginning of the index file. In addition, the index file may contain an identifier that distinguishes the identification information from the excerpt information.

Since identification information is designated to a predetermined location, the recording apparatus and so forth can easily read the identification information from the designated location. In addition, since an identifier is used, the identification information can be stored in any location of the index file.

In the recording apparatus, the recording method, the program, the record medium on which the program has been recorded, and the electronic camera that has the recording apparatus, the identification information may be video data, audio data, text data, or the like.

In the recording apparatus, the recording method, the program, the record medium on which the program has been recorded, and the electronic camera that has the recording apparatus, the index file may be composed of a first area and a second area, the first area storing excerpt information of each of the plurality of files recorded on the record medium, the second area storing information that correlates the excerpt information of the plurality of files with entity data of the plurality of files, the second area further storing information that designates an identification information file that stores the identification information. In addition, the first area may further store information that identifies the record medium.

Since the identification information is recorded as an identification information file to a record medium, the recording apparatus and so forth can record identification information having a larger capacity than the case that it is stored in an index file. As a result, the identification information can have a flexibility in its types.

In the recording apparatus, the recording method, the program, the record medium on which the program has been recorded, and the electronic camera that has the recording apparatus, the record medium may be a disc shaped record medium and the index file may be recorded substantially on the innermost periphery of the disc shaped record medium.

Since the record location of the index file is designated in such a manner and substantially placed on the innermost periphery, the recording apparatus and so forth can simply, easily, and quickly read the index file.

BRIEF DESCRIPTION OF DRAWINGS

FIG. 1 is a block diagram showing an example of the structure a digital recording and reproducing apparatus;

FIG. 6 is a schematic diagram showing an example of a track atom (property);

FIG. 7 is a schematic diagram showing an example of entity data of a property;

FIG. 8 is a schematic diagram showing an example of a flag;

FIG. 9 is a schematic diagram showing an example of a track atom (text);

FIG. 10 is a schematic diagram showing an example of a track atom (thumbnail);

FIG. 11 is a schematic diagram showing an example of a track atom (index);

FIG. 12 is a schematic diagram showing the relation between data of a disc title and an index file; and FIG. 13 is a schematic diagram showing an example of the relation between a track (property) and property data.

BEST MODES FOR CARRYING OUT THE INVENTION

Figure 2A:
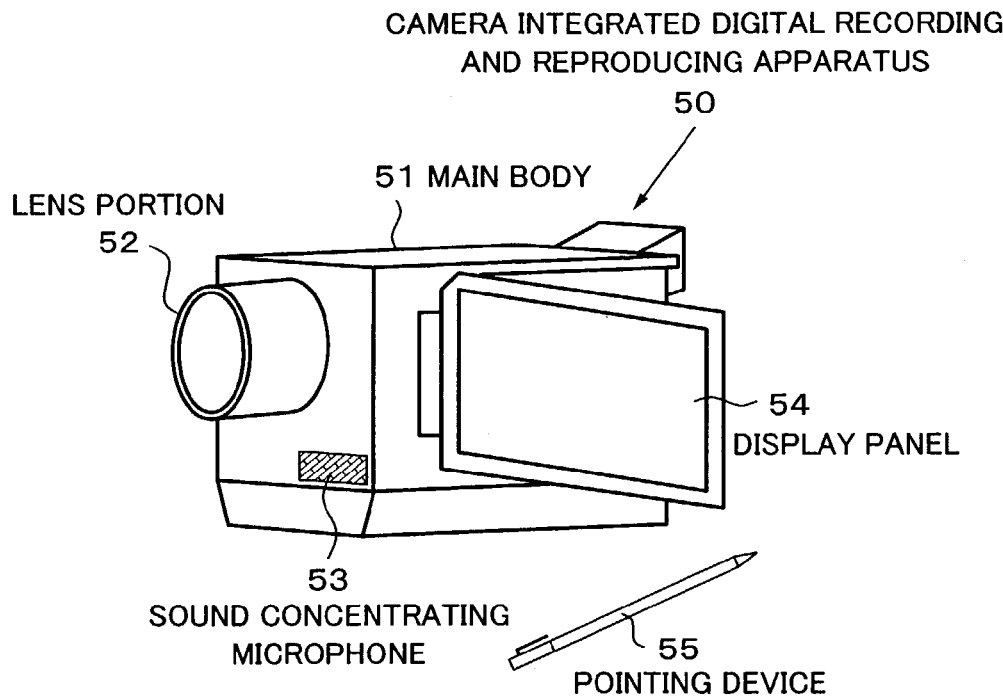
FIG. 2 is a schematic diagram showing an appearance of a camera integrated digital recording and reproducing apparatus.

Next, with reference to the accompanying drawings, an embodiment of the present invention will be described. In each drawing, redundant description of similar structures may be omitted.

FIG. 1 is a block diagram showing an example of the structure of a digital recording and reproducing apparatus.

In FIG. 1, the digital recording and reproducing apparatus comprises a video encoder 11, an audio encoder 12, a video decoder 13, an audio decoder 14, a file creator 15, a file decoder 16, memories 17 and 20, a memory controller 18, a system controlling microcomputer 19, an error correction code encoder/decoder 21, a drive controlling microcomputer 22, a data modulator/demodulator 23, a magnetic field modulation driver 24, an operating portion 26, a servo circuit 30, a motor 31, a magnetic field head 32, and an optical pickup 33.

A video signal is input from a video input terminal. The video signal is supplied to the video encoder 11. The video encoder 11 compresses and encodes the video signal. An audio signal is input from an audio input terminal. The audio signal is supplied to the audio encoder 12. The audio encoder 12 compresses and encodes the audio signal. Output signals of the video encoder 11 and the audio encoder 12 are called elementary streams.

According to the embodiment, it is assumed that the digital recording and reproducing apparatus is disposed in a camera integrated digital recording and reproducing apparatus. The video signal is supplied as a picture photographed by the video camera. An optical system supplies photographed light of an object to an image pickup device such as CCD (Charge Coupled Device) and generates a video signal. As the audio signal, a sound collected by a microphone is supplied.

When the compressing and encoding process corresponds to the MPEG system, the video encoder 11 comprises an analog/digital converter (hereinafter abbreviated as "A/D"), a format converting portion, a screen re-arranging portion, a subtracting portion, a DCT portion, a quantizing portion, a variable length code encoding portion, a buffer memory, a rate controlling portion, an inversely quantizing portion, an inverse DCT portion, an adding portion, a video memory, a motion compensating and predicting portion, and a switch as electronic circuits.

A video signal is supplied to the video encoder 11. The A/D digitizes the video signal. The format converting portion converts the digitized signal into a spatial resolution used in the encoding process. The spatial resolution is supplied to the screen rearranging portion. The screen rearranging portion rearranges the sequence of pictures so that they can be properly processed in the encoding process. In other words, the screen re-arranging portion re-arranges the sequence of pictures so that after I pictures and P pictures are encoded, B pictures are encoded.

An output signal of the screen re-arranging portion is input to the DCT portion through the subtracting portion. The DCT portion performs a DCT encoding process for the signal supplied from the screen re-arranging portion. An output signal of the DCT portion is input to the quantizing portion. The quantizing portion quantizes the output signal of the DCT portion with a predetermined number of bits. An output signal of the quantizing portion is input to the variable length code encoding portion and the inversely quantizing portion. The variable length code encoding portion encodes the output signal of the quantizing portion with a variable length code such as Huffman code of which short codes are allocated to frequent values. The encoded data is output to the buffer memory. The buffer memory outputs the encoded data as output data of the video encoder at a predetermined rate. Since the code amount generated by the variable length code encoding portion is variable, the rate controlling portion monitors the buffer memory and controls the quantizing operation of the quantizing portion so that a predetermined bit rate is kept.

On the other hand, since I pictures and P pictures are used as reference screens by the motion compensating and predicting portion, a signal that is input from the quantizing portion to the inversely quantizing portion is inversely quantized and then input to the inverse DCT portion. The inverse DCT portion performs the inverse DCT process for the inversely quantized signal. An output signal of the inverse DCT portion and an output signal of the motion compensating and predicting portion are added by the adding portion. The added signal is input to the video memory. An output signal of the video memory is input to the motion compensating and predicting portion. The motion compensating and predicting portion performs a forward prediction, a backward prediction, and a bi-directional prediction for the output signal of the video memory. An output signal of the motion compensating and predicting portion is output to the adding portion and the subtracting portion. The inversely quantizing portion, the inverse DCT portion, the adding portion, the video memory, and the motion compensating and predicting portion compose a local decoding portion that outputs the same decoded video signal as the video decoder.

The subtracting portion subtracts the output signal of the screen re-arranging portion from the output signal of the motion compensating and predicting portion and obtains a predictive error between the video signal and the decoded video signal decoded by the local decoding portion. When the intra-frame encoding process is performed (namely, I pictures are supplied), the switch causes the subtracting device not to perform a subtracting process for them. In other words, the I pictures are supplied to the DCT portion.

Returning to FIG. 1, when for example MPEG/Audio layer 1/layer 2 is used, the audio encoder 12 further comprises a sub band encoding portion and an adaptive quantizing bit assigning portion as electronic circuits. The audio signal is divided into 32 sub band signals by the sub band encoding portion. The 32 sub band signals are quantized corresponding to psychological hearing sense weighting by the adaptive quantizing bit assigning portion. The quantized signal is output as a bit stream.

To improve the encoding quality, MPEG/Audio layer 3 may be used. When the MPEG/Audio layer 3 is used, the audio encoder 12 further comprises an adaptive block length modified discrete cosine transform portion, a folded distortion suppression butterfly portion, a non-linear quantizing portion, and a variable length code encoding portion.

An output signal of the video encoder 11 and an output signal of the audio encoder 12 are supplied to the file creator 15. The file creator 15 converts the video elementary stream and the audio elementary stream into file structures that a computer software program that synchronously reproduces a moving picture, sound, and text can handle without need to use a particular hardware structure. Such a computer software program is for example QuickTime™ (hereinafter abbreviated as "QT"). Next, the case that QT is used will be described. The file creator 15 multiplexes the encrypted video data and the encrypted audio data under the control of the system controlling microcomputer 19.

A QuickTime™ movie file that is output from the file creator 15 is successively written to the memory 17 through the memory controller 18. When the system controlling microcomputer 19 requests the memory controller 18 to write data to a record medium 40, the memory controller 18 reads a QuickTime™ movie file from the memory 17.

In this case, the transfer rate of an encoded QuickTime™ movie is designated so that it is lower than (for example, ½ of) the transfer rate of data written to the record medium 40. Thus, although a QuickTime™ movie file is successively written to the memory 17, a QuickTime™ movie file is intermittently read from the memory 17 under the control of the system controlling microcomputer 19 so that the memory 17 does not overflow or underflow.

The QuickTime™ movie file that is read from the memory 17 is supplied from the memory controller 18 to the error correction code encoder/decoder 21. The error correction code encoder/decoder 21 temporarily writes the QuickTime™ movie file to the memory 20 so as to generate redundant data of interleaved data and an error correction code. The error correction code encoder/decoder 21 reads the redundant data from the memory 20 and supplies the redundant data to the data modulator/demodulator 23.

When digital data is recorded to the record medium 40, the data modulator/demodulator 23 modulates the data so that a clock can be easily extracted from the reproduced signal and no inter-code interference takes place. For example (1, 7) RLL (run length limited) code, Trellis code, and so forth can be used.

An output signal of the data modulator/demodulator 23 is supplied to the magnetic field modulation driver 24 and the optical pickup 33. The magnetic field modulation driver 24 drives the magnetic field head 32 corresponding to the input signal so as to apply a magnetic field to the record medium 40. The optical pickup 33 radiates a recording laser beam corresponding to the input signal to the record medium 40. In such a manner, data is recorded to the record medium 40.

The record medium 40 is a rewritable optical disc (for example, MO: magneto-optical disc), or a phase change type disc.

To allow an index file that will be described later to be easily read, it is preferred to record it on the substantially innermost periphery of a disc shaped record medium (for example, a record portion immediately preceded by a lead-in portion of a CD-ROM).

According to the embodiment, an MO, for example, a relatively small disc whose diameter is around 4 cm, 5 cm, 6.5 cm, or 8 cm, is used. The record medium 40 is rotated at constant linear velocity (CLV), constant angular velocity (CAV), or zone CLV (ZCLV) by the motor 31.

The drive controlling microcomputer 22 outputs a signal to the servo circuit 30 corresponding to a request from the system controlling microcomputer 19. The servo circuit 30 controls the motor 31 and the optical pickup 33 corresponding to the output signal of the drive controlling microcomputer 22. As a result, the drive controlling microcomputer 22 controls the entire drive. For example, the servo circuit 30 performs a radius traveling servo operation, a tracking servo operation, and a focus servo operation for the record medium 40 and controls the rotations of the motor 31.

The operating portion 26 is connected to the system controlling microcomputer 19. The user can input a predetermined command to the operating portion 26.

In the reproduction mode, the optical pickup 33 radiates a laser beam having a reproduction output level to the record medium 40. The optical detector of the optical pickup 33 receives the reflected light as a reproduction signal. In this case, the drive controlling microcomputer 22 detects a tracking error and a focus error from an output signal of the optical detector of the optical pickup 33. The servo circuit 30 controls the optical pickup 33 so that the reading laser beam focuses on a predetermined track. In addition, the drive controlling microcomputer 22 controls the traveling in the radius direction of the optical pickup so as to reproduce data at a desired position on the record medium 40. Like the record mode, the desired position is determined by the system controlling microcomputer 19 in such a manner that it supplies a predetermined signal to the drive controlling microcomputer 22.

A signal reproduced by the optical pickup 33 is supplied to the data modulator/demodulator 23. The data modulator/demodulator 23 demodulates the reproduced signal. The demodulated data is supplied to the error correction code encoder/decoder 21. The reproduced data is temporarily stored in the memory 20. The error correction code encoder/decoder 21 performs a de-interleaving process and an error correcting process for the demodulated data. The QuickTime movie file that has been error corrected is stored to the memory 17 through the memory controller 18.

The QuickTime™ movie file stored in the memory 17 is output to the file decoder 16 corresponding to a request from the system controlling microcomputer 19. The system controlling microcomputer 19 monitors the data amount of the reproduction signal reproduced from the record medium 40 and stored in the memory 17 and the data amount of the data that is read from the memory 17 and supplied to the file decoder 16 and controls the memory controller 18 and the drive controlling microcomputer 22 so that the memory 17 does not overflow or underflow. In such a manner, the system controlling microcomputer 19 intermittently reads data from the record medium 40.

The file decoder 16 separates the QuickTime™ movie file into a video elementary stream and an audio elementary file under the control of the system controlling microcomputer 19. The video elementary stream is supplied to the video decoder 13. The video decoder 13 decodes the video elementary stream that has been compressed and encoded. The decoded video data is output from a video output terminal. The audio elementary stream is supplied to the audio decoder 14. The audio decoder 14 decodes the audio elementary stream that has been compressed and encoded. The decoded audio data is output from an audio output terminal. The file decoder 16 synchronously outputs the video elementary stream and the audio elementary stream.

When the video decoder 13 corresponds to the MPEG system, the video decoder 13 comprises a buffer memory, a variable length code decoding portion, an inversely quantizing portion, an inverse DCT portion, an adding portion, a video memory, a motion compensating and predicting portion, a screen rearranging portion, and a digital/analog converter (hereinafter abbreviated as "D/A") as electronic circuits. A video elementary stream is temporarily stored in the buffer memory. Thereafter, the video elementary stream is input to the variable length code decoding portion. The variable length code decoding portion decodes macro block encoded information and separates it into a predicting mode, a moving vector, quantizer information, and quantized DCT coefficients. The inversely quantizing portion de-quantizes the quantized DCT coefficients into DCT coefficients. The inverse DCT portion coverts the DCT coefficients into pixel spatial data. The adding portion adds an output signal of the inverse DCT portion and an output signal of the motion compensating and predicting portion. However, when an I picture is decoded, the adding portion does not add these output signals. All macro blocks of the screen are decoded. The screen rearranging portion re-arranges the decoded macro blocks in the original input sequence. The D/A converts the re-arranged data into an analog signal. Since an I picture and a P picture are used as reference screens in the decoding process that follows, they are stored in the video memory. The I picture and the P picture are output to the motion compensating and predicting portion.

When MPEG/Audio layer 1/layer 2 is used, the audio decoder 14 comprises a bit stream disassembling portion, an inversely quantizing portion, and a sub band combining filter bank portion as electronic circuits. An input audio elementary stream is supplied to the bit stream disassembling portion. The bit stream disassembling portion separates the input audio elementary stream into a header, auxiliary information, and a quantized sub band signal. The inversely quantizing portion inversely quantizes the quantized sub band signal with a predetermined number of bits that has been assigned. The sub band combining band filter combines the inversely quantized data and outputs the combined data.

Figure 2B:
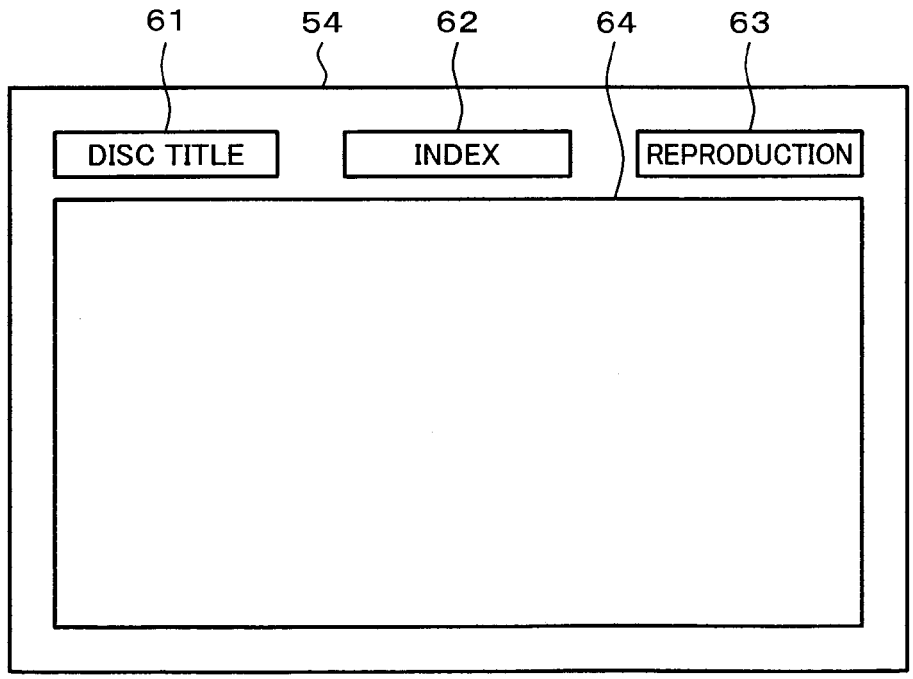

FIG. 2 is a schematic diagram showing an appearance of a camera integrated digital recording and reproducing apparatus. FIG. 2A is an overall view showing the camera integrated digital recording and reproducing apparatus. FIG. 2B is a schematic diagram showing an example of a display on a display panel.

In FIG. 2A, the camera integrated digital recording and reproducing apparatus 50 comprises a main body 51, a lens portion 52, a sound concentrating microphone 53, and a display panel 54.

The digital recording and reproducing apparatus shown in FIG. 1 is disposed in the main body 51. Photographed light of an object is supplied from an optical system of the lens portion 52 to an image pickup device. The image pickup device generates a video signal corresponding to the photographed light. An audio signal is generated by the sound concentrating microphone 53. The display panel 54 displays a reproduced picture and data corresponding to an operation of the apparatus. The display panel 54 is composed of a liquid crystal display and a piezoelectric device. When the user inputs a desired operation command, he or she presses the display portion with a pointing device 55.

As shown in FIG. 2B, the display panel 54 is shared by an operation input and an operation content display. The display panel 54 has a disc title portion 61, an index portion 62, a reproduction portion 63, and a main display portion 64.

When the disc title portion 61 is pressed with the pointing device 55 or the like, the disc title portion 61 displays identification information that identifies a record medium inserted into the camera integrated digital recording and reproducing apparatus 50 (in the embodiment, the identification information is referred to as "disc title") on the main display portion 64. In addition, the disc title portion 61 shows that the content displayed on the main display portion 64 is identification information.

When the index portion 62 is pressed with the pointing device 55 or the like, excerpt information of a plurality of files recorded on a record medium inserted into the camera integrated digital recording and reproducing apparatus 50 is displayed on the main display portion 64. In addition, the index portion 62 represents that the content displayed on the main display portion 64 is a typical picture. A typical picture is for example so-called thumbnail picture.

When the reproduction portion 63 is pressed with the pointing device 55 or the like, if text data and audio data is attached to a disc title or excerpt information of a file, they are reproduced corresponding to the display on the main display portion 64. Text data is displayed at a predetermined position of the main display portion 64, for example a lower portion or a right portion of the main display portion 64.

When a record medium is formatted or after a picture is photographed, the camera integrated digital recording and reproducing apparatus 50 creates a disc title and excerpt information of a file. According to the embodiment, the disc title is created in the same format as an index file. The created disc title is stored as one piece of data of the index file. According to the embodiment, an index file is created in the format of a QuickTime™ movie file. Since an index file is created in the format of a QuickTime™ movie file, a plurality of types of entity data such as video data and audio data, excerpt information of a file, and a disc title can be recorded in the same format. Thus, the recoding and reproducing apparatus can reproduce all types of data on QT.

Next, a QuickTime™ movie file will be described in brief. QT is a software program that manages various types of data along the time base and that has an OS extension function for synchronously reproducing a moving picture, a sound, a text, and so forth without need to use a special hardware device. QT has been disclosed in for example "Inside Macintosh: QuickTime™ (Japanese Edition)", Addison Wesley.

A basic data unit of a QT movie resource is called an atom. Each atom contains a size and type information along with data. In QT, the minimum unit of data is treated as a sample. As a set of samples, a chunk is defined.

Figure 3:
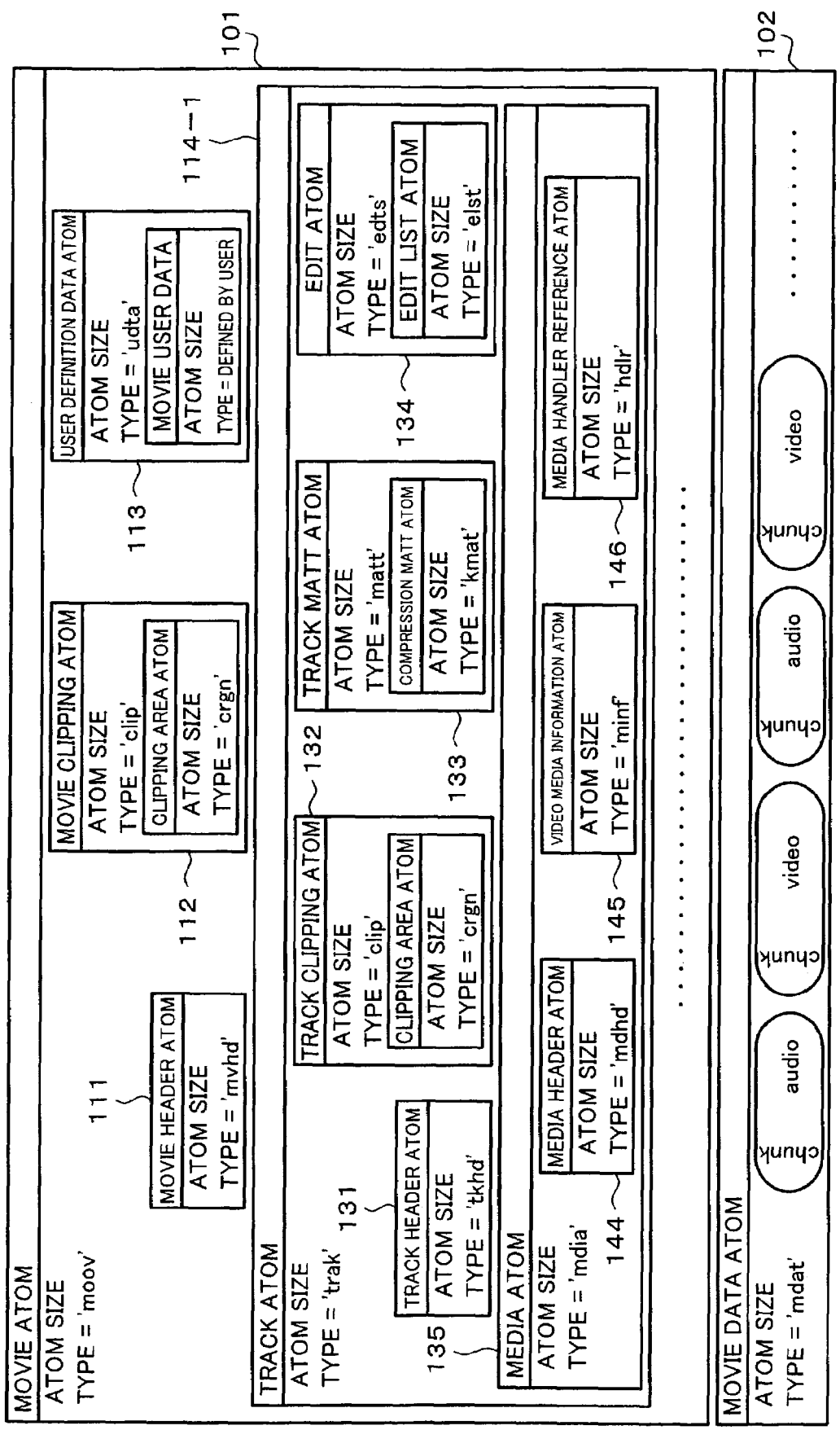
FIG. 3 is a schematic diagram showing an example of the structure of a QuickTime™ movie file.

FIG. 3 is a schematic diagram showing an example of the structure of a QuickTime™ movie file.

Figure 4:
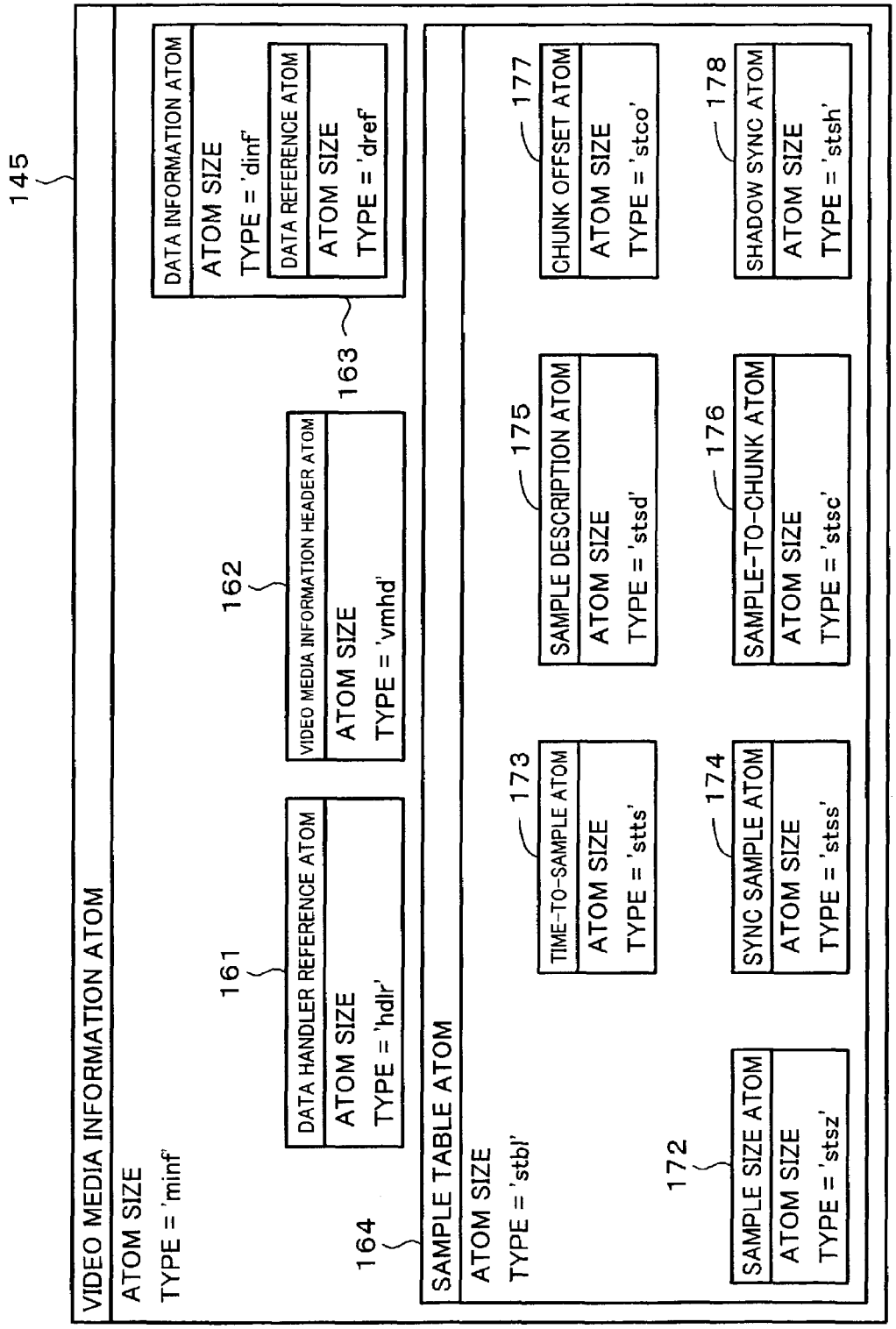
FIG. 4 is a schematic diagram showing an example of the structure of a video media information atom.

FIG. 4 is a schematic diagram showing an example of the structure of a video media information atom. FIG. 4 is a detailed schematic diagram showing the video media information atom shown in FIG. 3 in the case that tracks are video information.

In FIGS. 3 and 4, a QuickTime™ movie file is mainly composed of two portions that are a movie atom 101 and a movie data atom 102. The movie atom 101 is a portion that contains information necessary for reproducing a file and information necessary for referencing entity data. The movie data atom 102 is a portion that contains entity data such as video data and audio data.

The movie atom 101 contains a movie header atom 111, a movie clipping atom 112, a user definition data atom 113, at least one track atom 114-1, and so forth. The movie header atom 111 contains information with respect to the entire movie. The movie clipping atom 112 designates a clipping area.

The track atom 114-1 is provided for each track of a movie. The track atom 114 contains a track header atom 131, a track clipping atom 132, a track matte atom 133, an edit atom 134, and a media atom 135. The track atom 114-1 describes information with respect to individual pieces of data of the movie data atom 102 in the atoms 131 to 135. FIG. 3 shows only a track atom 114-1 of a video movie (omitting other track atoms).

The media atom 135 contains a media header atom 144, a media information atom (video media information atom 145 in FIGS. 3 and 4), and a media handler reference atom 146. The media atom 135 describes information that defines components for interpreting data of a movie track and media data in the media header atom 144, the media information atom, and the media handler reference atom 146.

The media handler maps a media time to media data using the information of the media information atom.

The media information atom 145 contains a data handler reference atom 161, a media information header atom 162, a data information atom 163, and a sample table atom 164.

The media information header atom (a video media information header atom 162 in FIG. 4) describes information with respect to media. The data handler reference atom 161 describes information with respect to handling of media data. The data handler reference atom 161 contains information that designates a data handler component that provides an access means for media data. The data information atom 163 contains a data reference atom. The data reference atom describes information with respect to data.

The sample table atom 164 contains information necessary for converting a media time into a sample number that represents a sample position. The sample table atom 164 is composed of a sample size atom 172, a time-to-sample atom 173, a sync sample atom 174, a sample description atom 175, a sample-to-chunk atom 176, a chunk offset atom 177, and a shadow sync atom 178.

The sample size atom 172 describes the size of a sample. The time-to-sample atom 173 describes the relation between samples and time base (how many seconds and minutes of data have been recorded ?). The sync sample atom 174 describes information with respect to synchronization and designates a key frame of media. A key frame is a self included frame that does not depend on the preceding frame. The sample description atom 175 contains information necessary for decoding a sample of media. Media can have at least one sample description atom corresponding to a compression type used in media. The sample-to-chunk atom 176 references a table contained in the sample description atom 175 and identifies a sample description corresponding to each sample of media. The sample-to-chunk atom 176 describes the relation between samples and chunks. The sample-to-chunk atom 176 identifies the position of a sample of media corresponding to information of the beginning chunk, the number of samples per chunk, and a sample description ID. The chunk offset atom 177 describes the start bit position of a chunk of movie data and defines the position of each chunk of a data stream.

In FIG. 3, the movie data atom 102 contains audio data encoded corresponding to a predetermined compressing and encoding system and video data that has been encoded corresponding to a predetermined compressing and encoding system in the unit of a chunk composed of a predetermined number of samples. It is not always necessary to compress and encode data. Instead, linear data can be contained. For example, when text, MIDI (Musical Instrument Digital Interface), or the like is handled, the movie data atom 102 contains entity data of text, MIDI, or the like. Correspondingly, the movie atom 101 contains a text track, a MIDI track, or the like.

Each track of the movie atom 101 is correlated with data contained in the movie data atom 102.

With such a hierarchical structure, when data contained in the movie data atom 102 is reproduced, QT successively traces the hierarchical structure from the movie atom 101, maps a sample table to memory corresponding to the atoms 172 to 178 contained in the sample table atom 164, and identifies the relation of each piece of data. QT reproduces data corresponding to the relation of each piece of data.

QT has such a data structure. Thus, in the index file according to the embodiment, entity data of a disc title and entity data of excerpt information of the file are contained in the movie data atom. Management information of these entity data is contained in the movie atom. Hereinafter, the movie data atom of the index file is called index data atom. The movie atom is called index atom. Since the index file is created, the disc title is created in the same format as excerpt information of the file and contained in the index file.

The index file depends on data handled by a file recorded on a record medium. According to the embodiment, however, it is assumed that types of data of a file are video data and audio data. Hereinafter, such a file is abbreviated as "AV file".

When an AV file has been recorded on a record medium, the index file contains for example four types of data that are a property, a text, a thumbnail, and an intro. A property is data that represents attributes of a disc title and each AV file. Thus, in the index file, only a property that contains attribute information is essential. A text is data that represents a character string of a disc title and a title of each AV file. A thumbnail is data of one picture that typifies a disc title or each AV file. The user can freely assign a thumbnail of a disc title. Alternatively, for example, video data contained in the second entry area of the index file can be automatically assigned as a thumbnail of the disc title. Likewise, the user can freely assign a thumbnail of each AV file. Alternatively, for example, the first video data of each AV file can be automatically assigned as thumbnail data thereof. An intro is audio data of a short period that typifies a disc title or each AV file. The user can freely assign an intro of a disc title. Alternatively, for example, audio data contained in the second entry area of the index file may be automatically assigned as intro data. Likewise, the user can freely assign an intro of each AV file. Alternatively, audio data of the first several seconds, for example five seconds, of each AV file may be assigned as an intro thereof. When necessary, in consideration of the searching efficiency, areas for a title, a thumbnail, and an intro may be provided in the index file. Although data of a property should be registered, even if the areas for a title, a thumbnail, and an intro have been allocated, it is not necessary to register all data of the title, thumbnail, and intro.

Figure 5:
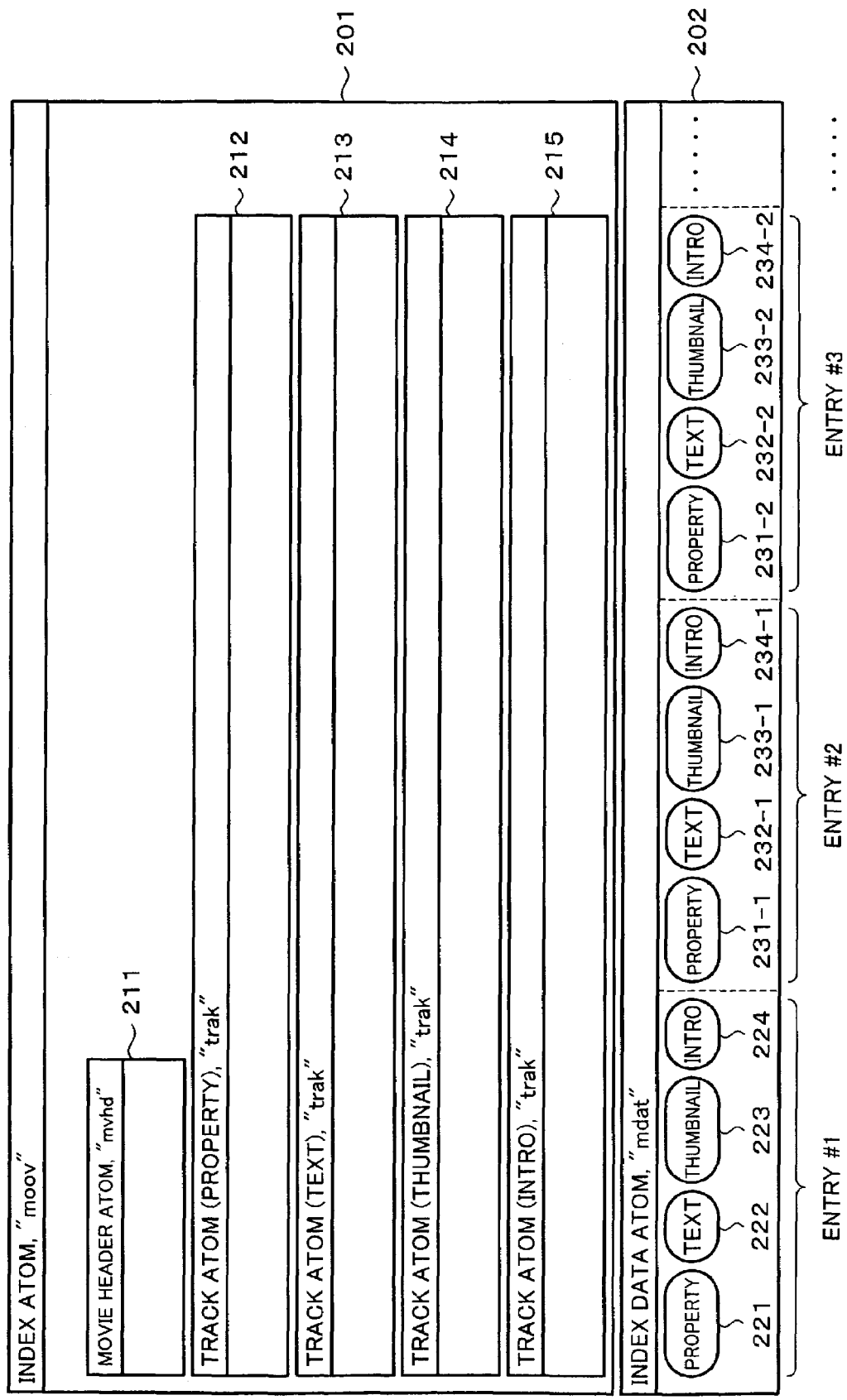
FIG. 5 is a schematic diagram showing an example of an index file created with a QuickTime™ movie file.

FIG. 5 is a schematic diagram showing an example of an index file created with a QuickTime™ movie file.

In FIG. 5, an index file is composed of an index atom 201 and an index data atom 202.

The index data atom 202 contains entity data of a property, a text, a thumbnail, and an intro. Entity data 221, 222, 223, and 224 of the property, the text, the thumbnail, and the intro of the disc title are contained in a first area, entry #1, of the index data atom 202. Entity data 231, 232, 233, and 234 of the property, text, thumbnail, and intro of each AV file are contained in second or later area, one of entry #2 to entry #n (where n is any integer that is two or larger) of the index data atom 202.

The index atom 201 is composed of a movie header atom 211, a track atom (property) 212, a track atom (text) 213, a track atom (thumbnail) 214, and a track atom (intro) 115 corresponding to entity data of the property, text, thumbnail, and intro, respectively.

In addition, as was described above, only the track atom (property) 212 and the entity data 221 and 231 of the properties are essential.

FIG. 6 is a schematic diagram showing an example of the track atom (property).

In FIG. 6, the track atom (property) 212 has a format of a table that correlates AV file property #1, AV file property #2, . . . , AV file property #n defined as chunks of property data of the disc title and each AV file, data lengths L_PR1, L_PR2, . . . , L_PRn, and start byte positions 0, L_PR1, L_PR1+L_PR2, L_PR+1+ . . . +L_PRn−1. The data length is for example a variable length in the unit of a byte.

FIG. 7 is a schematic diagram showing an example of entity data of a property.

In FIG. 7, each of entity data 221 and 231 of properties is composed of an entry number, a version, a flag, a data type, a creation time, a modification time, a duration, and a file identifier.

The entry number is a number that starts from 1. The entry number represents in what entry the entity data of the property is contained. The entry number is three-byte data that starts from the 0-th byte. With the entry number, the camera integrated digital recording and reproducing apparatus 50 can detect an area for the disc title of the index file.

The version is one-byte data that starts from the third byte. The flag is two-byte data that starts from the fourth byte. The data type represents the type (moving picture, still picture, audio, or the like) of data of a title file or an AV file corresponding to the property. The data type is one-byte data that starts from the sixth byte. A title file is a file that contains a disc title. The creation time represents the date and time on and at which a tile file or an AV file corresponding to the property was created. The creation time is four-byte data that starts from the seventh byte. The modification time represents the date and time on and at which a title file or an AV file corresponding to the property was modified. The modification time is four-byte data that starts from the eleventh byte. The duration represents a time period necessary for reproducing a title file or an AV file corresponding to the property. The duration is four-byte data that starts from the fifteenth byte. The file identifier represents a file name of a title file or an AV file corresponding to the property. The file identifier is variable length data that starts from the nineteenth byte.

When a disc title is represented with at least one of a text, a thumbnail, and an intro of an index file, if a title file is not created, a predetermined file name (for example, "VACANCY") that has been designated represents that the title file has not been created (namely, the title file has not been recorded on the record medium).

In FIG. 8, the flag is composed of 16 bits. The 0-th bit is 0 when entry data is a file. The 0-th bit is 1 when entry data is a file group or a directory. The first bit is 0 when there is no data that is referenced in a title file or an AV file. The first bit is 1 when there is data that is referenced in a title file or an AV file.

The second bit is 0 when text data has not been registered to a title file or an AV file. The second bit is 1 when text data has been registered to a title file or an AV file. The third bit is 0 when text data is contained in an index file. The third bit is 1 when text data is contained in a title file or an AV file designated by property data.

The fourth bit is 0 when thumbnail data has not been registered to a title file or an AV file. The fourth bit is 1 when thumbnail data has been registered to a title file or an AV file. The fifth bit is 0 when thumbnail data is contained in an index file. The fifth bit is 1 when thumbnail is contained in a title file or an AV file designated by property data.

The sixth bit is 0 when intro data has not been registered to a title file or an AV file. The sixth bit is 1 when intro data has been registered to a tile file or an AV file. The seventh bit is 0 when intro data is contained in an index file. The seventh bit is 1 when intro data is contained in a title file or an AV file designated by property data.

The eighth to fifteenth bits are reserved for flag flexibility.

According to the embodiment, character information such as a title that identifies a record medium or a file can be assigned to a disc title and each AV file. The character information is contained as text data in the texts 222 and 232 of the index data atom 202. Management information for the character information is contained in the track atom (text) of the index atom 201.

FIG. 9 is a schematic diagram showing an example of the track atom (text).

In FIG. 9, the track atom (text) 213 has a format of a table that correlates text data #1, text data #2, . . . , text data #n defined as chunks of data of character strings corresponding to a disc title and each AV file, data lengths L_TX1, L_TX2, . . . , L_TXn, and start byte positions 0, L_TX1, L_TX1+L_TX2, . . . , L_TX1+ . . . +L_TXn−1. The data length is for example a variable length in the unit of a byte.

According to the embodiment, video information such as a thumbnail that identifies a record medium or a file can be added to a disc title and each AV file. The video information is contained as still picture data in the thumbnails 223 and 233 of the index data atom 202. Management information for the video information is contained in the track atom (thumbnail) of the index atom 201.

FIG. 10 is a schematic diagram showing an example of the track atom (thumbnail).

In FIG. 10, the track atom (thumbnail) 214 has a format of a table that correlates thumbnail data #1, thumbnail data #2, . . . , thumbnail data #n defined as chunks of data of thumbnails of a disc title and each AV file, data lengths L_TH1, L_TH2, . . . , L_THn, and start byte positions 0, L TH1, L_TH1+L_TH2, L_TH1+L_THn−1. The data length is for example a variable length in the unit of a byte.

In addition, according to the embodiment, audio information such as an intro that identifies a record medium or a file can be added to a disc title and each AV file. The audio information is contained as audio data in the intros 224 and 234 of the index data atom 202. Management information for the audio information is contained in the track atom (intro) of the index atom 201.

FIG. 11 is a schematic diagram showing an example of the track atom (intro).

In FIG. 11, the track atom (intro) 115 has a format of a table that correlates intro data #1, intro data #2, . . . , intro data #n defined as chunks of data of intros of a disc title and each AV file, data lengths L_IN1, L_IN2, . . . , L_INn, and start byte positions 0, L_IN1, L_IN1+L_IN2, . . . , L_IN1+ . . . +L_INn−1. The data length is for example a variable length in the unit of a byte.

Data of a disc title can be directly contained in an index file. Alternatively, data of a disc title can be contained in a title file designated by property data.

FIG. 12 is a schematic diagram showing the relation between data of a disc title and a index file. FIG. 12A shows the case that data of a disc title is contained in an index file. FIG. 12B shows the case that data of a disc title is contained in a title file 251 designated by property data.

In the case shown in FIG. 12A, the entry number of the property is entry #1. The first to seventh bits of the flag of the property are 0000000. The file identifier is "VACANCY". Data of the disc title is registered to at least one of a text 222-*a*, a thumbnail 223-*a*, and an intro 224-*a*.

On the other hand, in the case of FIG. 12B, the entry number of the property is entry #1. The first to seventh bits of the flag of the property are 1000000. The file identifier is the file name of the title file 251, for example "SERI". Data of the disc title is freely registered to a text 222-*b*, a thumbnail 223-*b*, and an intro 224-*b*.

The title file 251 contains data with respect to a disc title. The data is for example a moving picture, a still picture, audio, and so forth.

When a record medium on which such an index file has been recorded is inserted into the camera integrated digital recording and reproducing apparatus 50, the system controlling microcomputer 19 thereof reads data of the entry number #1 of the index file.

Thereafter, the system controlling microcomputer 19 references the file identifier of the property. When the file identifier is not "VACANCY", the system controlling microcomputer 19 reads the title file represented by the file identifier and reproduces the title file.

In contrast, when the file identifier is "VACANCY", since there is no title file to be referenced, the system controlling microcomputer 19 references the flag and reproduces a text, a thumbnail, or an intro corresponding to the flag.

When there is a title file, if there is also a text, a thumbnail, or an intro, the system controlling microcomputer 19 may be designed to reproduce data of the title file with priority. Alternatively, the system controlling microcomputer 19 may be designed to reproduced both data of a title file and data of an index file and display them on divided areas of the main display portion 64 at a time.

In such a manner, the camera integrated digital recording and reproducing apparatus 50 according to the embodiment can quickly display a disc title of an index file. With the disc title, the user can easily know the contents of the record medium. As a result, the user can simply and easily manage a plurality of record mediums. In addition, since a disc title, an index of each AV file, and each AV file are recorded in the same format, it is not necessary to provide a special reproducing mechanism that displays the disc title.

According to the embodiment, to allow data to be quickly read from a record medium, data of a disc title is contained in entry #1, which is the first area of the index file. However, it should be noted that the present invention is not limited to such a format.

Data of a disc title can be fixedly assigned to any area of an index file. In this case, an entry that contains the disc title is pre-designated. When data of a disc title is read from a record medium, an assigned entry number as a fixed value is supplied to the digital recording and reproducing apparatus or the like. The digital recording and reproducing apparatus searches for the assigned entry number and reads data of the disc title corresponding thereto. When entry number #3 has been assigned, the digital recording and reproducing apparatus reads data whose entry number of the property is 3.

In addition, data of a disc title can be assigned to any area of an index file. In this case, a predetermined identifier that represents a disc title is recorded to the entry number of the property of a record medium. The identifier as a designated value is supplied to the digital recording and reproducing apparatus. When the data of a disc title is read from a record medium, the digital recording and reproducing apparatus searches the entry number of the property for the identifier and thereby obtains the data of the disc title. For example, "DTE" is designated as an identifier. The recording and reproducing apparatus reads data whose entry number of the property is "DTE".

FIG. 13 is a schematic diagram showing an example of the relation between a track (property) and property data.

When data of a movie, a movie, a still picture, a disc title, and audio has been registered to entries #1 to #5 of an index file, as shown in FIG. 13, chunk offsets of the track (property) are P_CO1, P_CO2, P_CO3, P_CO4, and P_co5 and the data lengths of the track (property) are $P\_L_1$, P_L2, P_L3, P_L4, and P_L5, respectively. The entry numbers of the property are 1, 2, 3, DTE, and 4. The data types of the property are movie, movie, still picture, disc title, and audio.

According to the present invention, in the recording apparatus, the recording method, the program, the record medium on which the program has been recorded, and the electronic camera that has the recording apparatus, identification information that identifies a predetermined one in a plurality of record mediums is stored in an index file that contains excerpt information of a plurality of files recorded on a record medium in the format of the index file. Thus, with the identification information that the recording apparatus reads from a record medium, the user can identify the record medium. As a result, the user can quickly search for a desired record medium. In addition, when the recording apparatus reads an index file from a record medium, the apparatus can obtain the identification information. Thus, the recording apparatus does need to provide a special mechanism and method for reading the identification information.

DESCRIPTION OF REFERENCE NUMERALS

11 Video Encoder
12 Audio Encoder
13 Video Decoder
14 Audio Decoder
15 File Creator
16 File Decoder
17, 20 Memory
18 Memory Controller
19 System Controlling Microcomputer
21 Error Correction Code Encoder/Decoder
23 Data Modulator/Demodulator
24 Magnetic Field Modulation Driver
26 Operating Portion
30 Servo Circuit
31 Motor
32 Magnetic Field Head
33 Optical Pickup
40 Record Medium
50 Camera Integrated Digital Recording and Reproducing Apparatus
51 Main Body
52 Lens Portion
53 Sound Concentrating Microphone
54 Display Panel
55 Pointing Device
201 Index Atom
202 Index Data Atom
221, 231 Property
222, 232 Text
223, 233 Thumbnail
224, 234 Intro
251 Title File

The invention claimed is:

1. A recording apparatus, comprising: creating means for excerpting excerpt information from each of a plurality of files recorded on a record medium, correlating the plurality of excerpt information with entity data of the plurality of files, and creating an index file that stores the correlated data in a predetermined format;
   record medium identification information storing means for storing identification information that identifies the record medium in the predetermined format to the index file; and
   recording means for recording the index file to the record medium,
      wherein when the index file indicates that a file identifier is not vacant, a title file is reproduced and when the index file indicates that the file identifier is vacant, text, a thumbnail or an introduction is reproduced.

2. The recording apparatus as set forth in claim 1, wherein the identification information is stored in an area at the beginning of the index file.

3. The recording apparatus as set forth in claim 1, wherein the index file contains an identifier that distinguishes the identification information from the excerpt information.

4. The recording apparatus as set forth in claim 1, wherein the identification information is video data.

5. The recording apparatus as set forth in claim 1, wherein the identification information is audio data.

6. The recording apparatus as set forth in claim 1, wherein the identification information is text data.

7. The recording apparatus as set forth in claim 1,
   wherein the index file is composed of a first area and a second area, the first area storing excerpt information of each of the plurality of files recorded on the record medium, the second area storing information that correlates the excerpt information of the plurality of files with entity data of the plurality of files, and
   wherein the second area further stores information that designates an identification information file that stores the identification information.

8. The recording apparatus as set forth in claim 7, wherein the first area further stores information that identifies the record medium.

9. The recording apparatus as set forth in claim 1 wherein the record medium is a disc shaped record medium, and
   wherein the index file is recorded substantially on the innermost periphery of the disc shaped record medium.

10. A recording method, comprising the steps of:
   excerpting excerpt information from each of a plurality of files recorded on a record medium;
   correlating the plurality of excerpt information with entity data of the plurality of files and creating an index file that stores the correlated data in a predetermined format;
   storing identification information that identifies the record medium in the predetermined format to the index file; and
   recording the index file to the record medium,
      wherein when the index file indicates that a file identifier is not vacant, a title file is reproduced and when the index file indicates that the file identifier is vacant, text, a thumbnail or an introduction is reproduced.

11. A computer-readable medium adapted to store a computer program that causes a computer to create and record an index file, the program comprising the steps of:

excerpting excerpt information from each of a plurality of files recorded on a record medium;

correlating the plurality of excerpt information with entity data of the plurality of files and creating the index file that stores the correlated data in a predetermined format;

storing identification information that identifies the record medium in the predetermined format to the index file; and recording the index file to the record medium,
wherein when the index file indicates that a file identifier is not vacant, a title file is reproduced and when the index file indicates that the file identifier is vacant, text, a thumbnail or an introduction is reproduced.

12. A computer readable medium on which a computer program has been recorded, the program causing a computer to create and record an index file, the program comprising the steps of:

excerpting excerpt information from each of a plurality of files recorded on a record medium;

correlating the plurality of excerpt information with entity data of the plurality of files and creating the index file that stores the correlated data in a predetermined format;

storing identification information that identifies the record medium in the predetermined format to the index file; and recording the index file to the record medium for controlling output of the excerpt information,
wherein when the index file indicates that a file identifier is not vacant, a title file is reproduced and when the index file indicates that the file identifier is vacant, text, a thumbnail or an introduction is reproduced.

13. An electronic camera that records an image signal of an image of an object that is photographed to a record medium, the electronic camera comprising:

creating means for excerpting excerpt information from each of a plurality of files recorded on the record medium, correlating the plurality of excerpt information with entity data of the plurality of files, and creating an index file that stores the correlated data in a predetermined format;

record medium identification information storing means for storing identification information that identifies the record medium in the predetermined format to the index file; and recording means for recording the index file to the record medium,
wherein when the index file indicates that a file identifier is not vacant, a title file is reproduced and when the index file indicates that the file identifier is vacant, text, a thumbnail or an introduction is reproduced.

* * * * *